United States Patent Office 3,312,636

Patented Apr. 4, 1967

1

3,312,636

FLAME-RETARDANT EPOXY RESIN COMPOSITIONS

John J. Rizzo, Hopewell Township, Mercer County, N.J., assignor to FMC Corporation, New York, N.Y., a corporation of Delaware No Drawing. Filed Jan. 5, 1962, Ser. No. 164,587
7 Claims. (Cl. 260—2)

This invention relates to flame-retardant expoy resin compositions, and more particularly, it relates to flame-retardant epoxidized butadiene polymer compositions containing certain phosphorus esters.

It is well known that various polymeric structures containing epoxy oxygen groups may be cured by cross-linking with polyfuctional curing agents such as polyamines, polyamides and polycarboxylic acids or anhydrides to form polymeric products of very high molecular weight. It is also known that glycidyl polyethers of the type derived from the condensation of Bisphenol-A and epichlorohydrin are most reactive, and provide optimum physical properties, when cured with polyamines. On the other hand, epoxidized butadiene polymers are known to be more reactive with polycarboxylic acids and anhydrides and to provide optimum physical properties when cured with these cross-linking agents.

Much investigation has been carried out in recent years in an attempt to provide flame-retardant epoxy resin compositions. It has been suggested that tris (β-chloroethyl) phosphate can be used with glycidyl polyethers to impart some degree of flame-retardance. However, this additive is recommended only with anhydride curing agents, and its use is accompanied by a degradation in the physical properties of the cured resin in proportion to the amount of phosphate additive present. When tris(β-chloroethyl) phosphate is used with polyamine curing agents, a precipitate forms which is believed to result from a reaction between the phosphate additive and the polyamine cross-linking agent.

It is an object of this invention to provide flame-retardant epoxidized butadiene polymer compositions.

Another object is to improve the physical properties of amine-cured epoxidized butadiene polymer compositions.

These and other objects will become apparent from the following description of this invention.

I have now found that epoxidized butadiene polymere compositions having excellent flame-retardance as well as outstanding physical properties can be prepared by curing 100 parts of an epoxidized butadiene polymer having an epoxy oxygen content of 4–10% with 0.4–1.0 equivalent per epoxide equivalent of an aromatic diamine and 1–75 parts of a phosphorus ester having the formula:

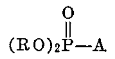

wherein A is a radical selected from the group consisting of —OR and

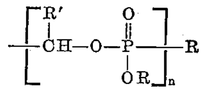

in which R is a haloalkyl radical containing 2–3 carbon atoms and 1–2 halogen atoms of the group consisting of chlorine and bromine, R′ is a member of the group consisting of hydrogen and alkyl radicals containing 1–3 carbon atoms, and $n$ is an integer from 1–3.

The compatibility and improved properties of the epoxy resin compositions taught herein are quire surprising. When epoxidized butadiene polymers are cured with polycarboxylic acids or anhydrides, the preferred cross-linking agents, in the presence of these phosphorus

2 esters, incompatibility develops and the properties of the product are degraded. Surprisingly however, the precipitation associated with the use of phosphate additives and aromatic diamines with glycidyl polyethers is not present in the case of epoxidized butadiene polymers. When epoxidized polybutadienes are cured with aromatic diamines, the incorporation of these phosphorous esters accelerates the rate of cure and improves the physical properties of the cured products to the point that they are comparable to, or better than, those obtained when using the heretofore preferred polycarboxylic acid or anhydride cross-linking agents.

A further advantage to the use of these phosphorous esters is that they reduce the viscosity of the epoxidized butadiene polymer. The phosphorous ester can be premixed with the epoxidized polymer thereby forming a stable mixture which is more readily handled and which can be stored for long periods of time..

The epoxidized butadiene polymers which are used as the base resin in the compositions taught herein are prepared by epoxidizing liquid polymers of butadiene. Any butadiene polymer containing sufficient residual unsaturation to be epoxidized to an epoxy content of at least about 4% may be used. The butadiene polymer may be a polybutadiene, that is a butadiene homopolymer, or a butadiene copolymer. Typical comonomers which may be polymerized with butadiene include vinyl benzenes such as styrene, α-methylstyrene and vinyltoluene, acrylate esters such as methyl, ethyl, propyl and butyl acrylate, methyl, ethyl, propyl and butyl methacrylate, and ethyl hexylarcrylate acrylonitrile, butene, diallylic esters such as diallyl phthalate, maleate, fumarate, succinate, and adipate, and polyalkyl-aromatic compounds such as xylene, mesitylene, tetralin, diethylbenzene, cumene, durene and polymethylnaphthalene. Terpolymers such as butadiene-acrylonitrile-styrene are also suitable as the base resin when epoxidized.

The butadiene polymer to be epoxidized may be prepared in any well known manner, such as emulsion or solution polymerization using a variety of catalysts, including free-radical, alkali metal, Friedel-Crafts, and organo-metallic catalysts. Useful techniques for the polymerization of butadiene polymers are described in U.S. Patents 2,631,175 and 2,791,618. Preferably, the butadiene polymer is polybutadiene prepared with an alkali metal as the catalyst and in the presence of a modifier such as dioxane. This technique is described by F. P. Greenspan and A. E. Pepe in copending application Ser. No. 789,809, filed January 29, 1959, now United States Patent No. 3,030,336.

Although any liquid butadiene polymer may be epoxidized, a convenient molecular weight range for the butadiene polymer is a member average of about 250–10,000. Best results are generally obtained with polymers having a molecular weight below about 2500, corresponding to a viscosity below about 50 poises measured at 25° C. and extrapolated to zero-shear. Higher polymers are very viscous when epoxidized, and thus it is generally necessary to dissolve the polymer in a solvent before carrying out the epoxidation and curing; for certain applications, such as coatings, this procedure is actually preferred. The lower limit of the molecular weight range for these polymers is about 100; that is, mixtures of dimers and trimers could actually be used, should they be desired to impart particular properties for special applications.

A preferred class of polybutadienes having a high proportion of external double bonds and a substantially linear structure is described by F. P. Greenspan and A. E. Pepe in copending application Ser. No. 789,809, filed Jan. 29, 1959. These polybutadienes can be epoxidized to an epoxy oxygen content of 8–10% without the corresponding large increase in viscosity which accompanies the epoxidation of other butadiene polymers. Epoxidized polybutadienes derived from these polybutadienes generally having viscosities in the range of about 1,000–3,000 poises.

For the epoxidation of the butadiene polymers, standard epoxidation techniques may be used. Aliphatic, aromatic, and inorganic peracids, salts of peracids, peroxides, and hydroperoxides are the most common of the effective epoxidizing agents. For convenience, lower aliphatic peracids, such as performic peracetic, perpropionic and perbutyric are preferred reagents. With these reagents, the epoxidation reaction may be carried out using a preformed peracid mixture, or the peracid may be formed in the reaction medium, generally by adding hydrogen peroxide to an aliphatic acid or anhydride medium. Peracids may be prepared in any known way, such as is described in Organic Synthesis, Reinhold Publishing Corp. (1957), page 302. A number of epoxidation techniques for polybutadiene are illustrated in U.S. Patent 2,826,556 to F. P. Greenspan and A. E. Pepe.

Preferably, the epoxidation is caried out by the in situ formation of peracetic acid, whereby the butadiene polymer is reacted with acetic acid and hydrogen peroxide in the presence of an ion exchange resin and a solvent. The solvent may be any low-boiling solvent for the product, such as benzene or toluene. When the reaction is complete, the epoxidation product is allowed to separate into an aqueous phase and a solvent phase. The solvent is then removed from the resin product by vacuum stripping. This method of epoxidation is described by F. P. Greenspan and R. J. Gall in U.S. Patent No. 2,919,283.

The epoxidation may be conducted using stoichiometric amounts of the peracid: that is, one mole of peracid per double bond in the polymer; or an amount below that theoretically required may be used. There is no significant advantage to using excess oxidant. In general, the epoxidized butadiene polymer should contain at least about 4% by weight of epoxy oxygen, and it is preferred for most applications that the epoxidized butadiene polymer contain about 8–10% epoxy oxygen by weight. Epoxidized butadiene polymers containing more than about 10% epoxy oxygen tend to be extremely viscous, especially in the higher molecular weight range; but this may actually be desired for special applications, such as coatings.

Any of the aromatic diamines may be used as curing agents in the epoxy resin compositions taught herein. Typical examples include m-phenylenediamine, para-phenylenediamine, p,p'-diaminodiphenylmethane, diaminodiphenyl sulfone, 2,4-diaminotoluene, 3,4-diaminotoluene, 2,4 - diamino - 1-ethylbenzene, 4,6-diamino-1,3-dimethylbenzene, 1,2-diaminonaphthalene, 1,5-diaminonaphthalene and 1,3-diaminonaphthalene. Based upon commercial availability, the preferred aromatic diamines are m-phenylenediamine, p,p'-diaminodiphenylmethane and mixtures thereof.

The amount of aromatic diamine required to cure the resin will vary depending upon the epoxy oxygen content of the epoxidized butadiene polymer, and the particular properties desired in the final product. In theory, about 1 epoxide equivalent of epoxidized polymer, that is, the amount of epoxidized polymer containing one atom of epoxy oxygen, should be present for each amine equivalent of aromatic diamine. There is no significant advantage in using more than the theoretical amount of aromatic diamine, and in practice, less than this amount has been found to be satisfactory. At least about 0.4 amine equivalent of aromatic diamine should be present for each epoxide equivalent of epoxidized polymer in order to provide an adequate cure for the epoxy resin. For best results, the resin composition should contain about 0.6–1.0 amine equivalent per epoxide equivalent. For a typical epoxidized polybutadiene containing an epoxy oxygen content of 9%, this is about 20–29 part by weight of m-phenylenediamine per 100 parts of epoxidized polybutadiene or about 40–58 parts of p,p'-diaminodiphenylmethane per 100 parts of epoxidized polybutadiene.

The novel feature of this invention is the use of a phosphorus ester to improve the physical properties of amine-cured epoxidized butadiene polymer compositions. One such class of phosphorus esters includes tris(haloalkyl) phosphates in which the haloalkyl radical contains 2–3 carbon atoms and 1–2 halogen atoms of the group consisting of chlorine and bromine. Typical examples of these phosphates include those in which the haloalkyl group is chloroethyl, bromoethyl, chloropropyl, bromopropyl, dichloropropyl, dibromopropyl, or bromochloropropyl.

These tris(haloalkyl) phosphates are readily prepared by the reaction of $POCl_3$ or $POBr_3$ with ethylene oxide, propylene oxide, epichlorohydrin or epibromohydrin. These reactions are illustrated by the following equation.

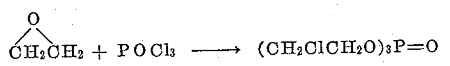

The corresponding bromine-substituted phosphates are prepared from $POBr_3$. Tris(dichloropropyl) phosphate is prepared by the reaction of $POCl_3$ and epichlorohydrin, while tris(bromochloropropyl) phosphate is prepared by reacting $POBr_3$ and epichlorohydrin.

A further class of phosphorus esters which may be used to improve the physical properties of amine-cured epoxidized butadiene polymer compositions includes those having the formula:

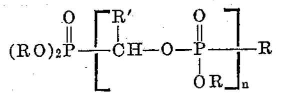

These esters are prepared by the reaction of a di(haloalkyl) phosphorochloridite, a tris(haloalkyl) phosphite and an aldehyde containing 1–4 carbon atoms followed by isomerization of the product. The di(haloalkyl) phosphorochloridite and the tris(haloalkyl) phosphite are in turn prepared, as is well known, by the reaction of an alkylene oxide or an epihalohydrin with a phosphorus trihalide, as illustrated by the following equations.

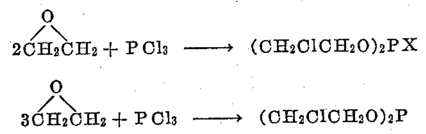

Suitable aldehydes include formaldehyde, acetaldehyde, propionaldehyde and butyraldehyde.

The reaction between the phosphite, phosphorochloridite and aldehyde is carried out by mixing the phosphite and phosphorochloridite and then slowly adding the aldehyde, while not allowing the temperature to rise significantly. When all of the aldehyde has been added, the temperature is raised to 65–100° C. at which temperature the volatile alkylhalide by-product is removed from the reaction. The reaction is illustrated by the following equation.

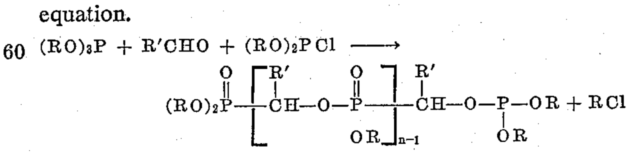

This product is then isomerized to the more stable form by heating to a temperature in the range of 135–225° C. as illustrated in the following equation.

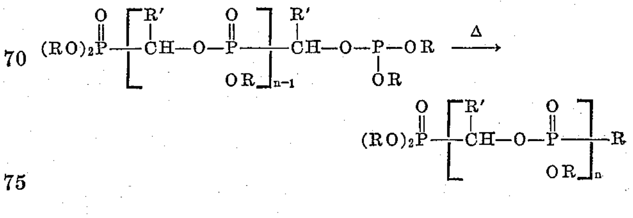

The chain length of the phosphorus ester is controlled by the amount of di(haloalkyl) phosphorochloridite and aldehyde present. For example, when equimolar amounts of the three reactants are present, the ester molecule corresponds to the above formula in which $n=1$. As the molar excess of phosphorochloridite and aldehyde is increased, a corresponding increase in the chain length of the ester results. Thus, when two moles of phosphorochloridite and two moles of aldehyde are present for each mole of phosphite, then $n=2$, etc.

The amount of phosphorus ester employed in the resin composition may vary from about 1–75 parts by weight of ester per 100 parts of epoxidized butadiene polymer, depending upon the desired result. Although some improvement in properties will result from the use of as little as 0.5 part per 100 of phosphorus ester, significant improvement, especially in heat distortion temperature, elevated temperature flexural strength and flame-retardance, is obtained with about 2 parts per 100. Preferably, the resin composition contains 5–40 parts per 100, while optimum physical properties are obtained with about 10–30 parts per 100. When more than about 40 parts per 100 of phosphorus ester are used, the physical properties of the cured resin are somewhat less than optimum, however, they are a definite improvement over the properties of resins containing no phosphorus ester. Furthermore, employing more than 40 parts per 100 of phosphorus ester has the advantage of lowering the cost of the total resin composition.

Additional ingredients may be added to the resin compositions of this invention, if desired. For example, a somewhat shortened cure time and improved physical properties can be obtained by the addition of a phenolic compound, such as resorcinol, Bisphenol-A or phenol, to the resin composition. These compounds may be employed in amounts up to about 15 parts by weight per 100 parts of epoxidized polymer. Preferably, resorcinol is used as the phenolic component in an amount of about 2–8 parts per 100.

The epoxy resin compositions of this invention are cured by blending together the proper amounts of each of the ingredients, and raising the blend to its curing temperature for a length of time sufficient to effect a cure. A particular advantage of the present invention is that the phosphorus ester can be premixed with the epoxidized butadiene polymer, thereby reducing the viscosity of the resin and facilitating blending of the resin with the aromatic diamine. Since aromatic diamines are generally solids, they are preferably melted before blending. When a phenolic compound is used, it is preferable to mix the aromatic diamine with the phenolic compound and melt them together. When all of the ingredients are in the liquid state, they are readily blended at room temperature, although elevated temperatures up to about the curing temperature may be used, if desired.

The epoxy resin compositions taught herein may be cured at temperatures in the range of about 80–200° C. to form a cross-linked thermoset product. Temperatures of at least about 100° C. are generally used, although lower temperatures may be used, if longer cure times can be tolerated. Temperatures in excess of about 200° C. are generally avoided in order to prevent charring of the product, although they may be used, if desired. Preferably, temperatures in the range of about 135–175° C. are employed. Cure times may vary from about 15 minutes to about 30 hours depending upon the curing temperature and the formulation of the epoxy resin composition.

The resin compositions of this invention may be used in a wide variety of applications. For example, they may be used for potting and encapsulating electrical and electronic components, casting, laminating and coating. For these applications the compositions may be combined with glass fibers, and other reinforcing agents, plasticizers, flexibilizers, fillers, extenders, pigments, dyes and many other materials used to modify the properties of resin compositions. The resin compositions of this invention are also suitable for use as a size for fiber-glass roving by treating glass filament with an emulsion of the resin composition in water.

The following examples, illustrating the novel resin compositions disclosed herein, are presented without any intention that the invention be limited thereto. All parts and percentages are by weight.

The properties of the products described in the examples were determined in accordance with standard ASTM test methods. Flexural strengths were measured under a standard laboratory atmosphere and at 155° C. by ASTM test method D790–59T using a straining rate of 0.01 inch per inch per minute. Heat distortion temperature was measured by ASTM test method D648–56 using a fiber stress of 264 p.s.i., and Rockwell hardness was determined by ASTM test method D785–60T using the M scale. Compressive strength of the laminates was measured by ASTM test method D695–54.

Flame-retardance was measured in accordance with ASTM test method D635–56T. Cured specimens of the product measuring 0.25 x 0.5 x 5 inches were marked by drawing lines 1 inch and 4 inches from one end of each specimen. Thus, each specimen was divided into 3 sections measuring 1 inch, 3 inches and 1 inch. The tip of a 1-inch Bunsen burner flame was applied to the end of each specimen for a period of 30 seconds. If the specimen did not continue to burn after the first ignition, the flame was immediately applied to the same end of the specimen for an additional 30-second period. If the sample did not burn after the second ignition, it was rated as nonburning. If the sample burned initially but went out before reaching the 4-inch line, it was rated as self-extinguishing and the amount of burning beyond the 1-inch line was noted.

*Example 1*

Butadiene was polymerized as follows: About 4.3 parts of sodium as a 46% dispersion in kerosene and 162 parts of benzene were charged to an agitated reactor, the temperature was raised to 90° C., and 6 parts of technical grade butadiene was added. The temperature was maintained at about 85° C., while 94 parts of butadiene and 20 parts of dioxane were added over a period of 3.5 hours. The reaction ingredients were then cooled to 50° C. and the catalyst was destroyed by the addition of 19 parts of glacial acetic acid. The mixture was filtered through 21 parts of soda ash, and the filtrate was stripped of volatiles over a temperature range of 19–55° C. at 23–57 mm. Hg. The residue was liquid polybutadiene, having an iodine number of 383 and a viscosity of 14 poises at 25° C. extrapolated to zero shear.

The polybutadiene was epoxidized as follows: One hundred parts of polybutadiene was dissolved in 100 parts of benzene, and 10 parts of 90% formic acid was added. The mixture was maintained at 60° C. while 65 parts of 50% hydrogen peroxide was added over a period of three hours. The reaction continued at a reflux temperature of about 75° C. for an additional four hours, after which the medium was cooled to 30° C., mixed with 120 parts of benzene and 26 parts of soda ash, and allowed to separate into layers. The oily layer was heated to 80° C. to remove the water azeotropically, and then stripped of benzene at 35° C. and 60 mm. Hg. The resulting epoxidized polybutadiene had an epoxy oxygen content of 8.83% and a viscosity of 1613 poises at 25° C. extrapolated to zero shear.

The epoxidized polybutadiene was cured as follows: A mixture containing 24 parts of m-phenylenediamine and 5 parts of resorcinol was heated at 100° C. until all of the solids were melted, and the resulting liquid mixture was blended with a mixture containing 10 parts of epoxidized polybutadiene and 2.5 parts of tris($\beta$-chloroethyl) phosphate. The blend was cast as a sheet and cured by baking in an oven for 1 hour at 100° C. and 4 hours at .55° C. Specimens of the cured resin were tested to de-ermine room temperature flexural strength. Additional pecimens were postcured at 155° C. for an additional 20 iours and tested for room temperature flexural strength, as its principal component. A different aromatic diamine is shown by formulation *n*. Formulation *o* shows a composition cured without any phenolic compound, while formulation *p* is a control containing no phosphate ester.

TABLE 1

| | Formulation | Parts | Room Temperature Flexural Strength p.s.i. | | Rockwell Hardness, M scale | Heat Distortion Temp., ° C. | Elevated Temperature Flexural Strength, p.s.i. | Flame-Retardance |
|---|---|---|---|---|---|---|---|---|
| | | | Precure | Postcure | | | | |
| (a) | Epoxidized polybutadiene<br>m-Phenylenediamine<br>Tris(β-chloroethyl) phosphate<br>Resorcinol | 100<br>24<br>2.5<br>5 | 17,800 | 15,100 | 110 | 128 | 2,900 | Self-ext., 1 in. |
| (b) | Epoxidized polybutadiene<br>m-Phenylenediamine<br>Tris(β-chloroethyl) phosphate<br>Resorcinol | 100<br>24<br>5<br>5 | 19,500 | 14,000 | 115 | 149 | 5,400 | Do. |
| (c) | Epoxidized polybutadiene<br>m-Phenylenediamine<br>Tris(β-chloroethyl) phosphate<br>Resorcinol | 100<br>24<br>10<br>5 | 20,200 | 15,300 | 119 | 175 | 6,300 | Non-burning. |
| (d) | Epoxidized polybutadiene<br>m-Phenylenediamine<br>Tris(β-chloroethyl) phosphate<br>Resorcinol | 100<br>24<br>20<br>5 | 20,700 | 20,300 | 120 | 180 | 8,200 | Do. |
| (e) | Epoxidized polybutadiene<br>m-Phenylenediamine<br>Tris(β-chloroethyl) phosphate<br>Resorcinol | 100<br>24<br>25<br>5 | 19,700 | 20,000 | 118 | 176 | 6,500 | Do. |
| (f) | Epoxidized polybutadiene<br>m-Phenylenediamine<br>Tris(β-chloroethyl) phosphate<br>Resorcinol | 100<br>24<br>30<br>5 | 20,800 | 19,500 | 118 | 148 | 5,500 | Do. |
| (g) | Epoxidized polybutadiene<br>m-Phenylenediamine<br>Tris(β-chloroethyl) phosphate<br>Resorcinol | 100<br>24<br>40<br>5 | 18,500 | 19,000 | 114 | 150 | 4,400 | Do. |
| (h) | Epoxidized polybutadiene<br>m-Phenylenediamine<br>Tris(β-chloroethyl) phosphate<br>Resorcinol | 100<br>24<br>50<br>5 | 18,400 | 19,000 | 110 | 138 | 2,640 | Do. |
| (i) | Epoxidized polybutadiene<br>m-Phenylenediamine<br>Tris(bromochloropropyl) phosphate<br>Resorcinol | 100<br>24<br>60<br>5 | 15,900 | 18,700 | 103 | 101 | 2,000 | Do. |
| (j) | Epoxidized polybutadiene<br>m-Phenylenediamine<br>Tris(bromochloropropyl) phosphate<br>Resorcinol | 100<br>24<br>70<br>5 | 13,500 | 16,900 | 95 | 85 | 1,500 | Do. |
| (k) | Epoxidized polybutadiene<br>m-Phenylenediamine<br>Tris(bromochloropropyl) phosphate<br>Resorcinol | 100<br>24<br>10<br>5 | 20,600 | 16,700 | 115 | 172 | 6,980 | Do. |
| (l) | Epoxidized polybutadiene<br>m-Phenylenediamine<br>Tris(β-chloropropyl) phosphate<br>Resorcinol | 100<br>24<br>10<br>5 | 18,100 | 16,400 | 114 | 174 | 4,900 | Do. |
| (m) | Epoxidized polybutadiene<br>m-Phenylenediamine<br>Phosgard C-22-R<br>Resorcinol | 100<br>24<br>10<br>5 | 17,400 | 17,700 | 118 | 176 | 5,800 | Do. |
| (n) | Epoxidized polybutadiene<br>p,p'-Diaminodiphenylmethane<br>Tris(β-chloroethyl) phosphate<br>Resorcinol | 100<br>48<br>10<br>5 | 20,400 | 19,200 | 115 | 165 | 6,400 | Do. |
| (o) | Epoxidized polybutadiene<br>m-Phenylenediamine<br>Tris(β-chloroethyl) phosphate | 100<br>24<br>20 | 21,300 | 15,800 | 117 | 175 | 6,200 | Do. |
| (p) | Epoxidized polybutadiene<br>m-Phenylenediamine<br>Resorcinol | 100<br>24<br>5 | 17,100 | 15,100 | 107 | 113 | 785 | Burning, 0.50 in./min. |

NOTE.—Phosgard C-22-R is a mixed polyphosphate whose principal component is:

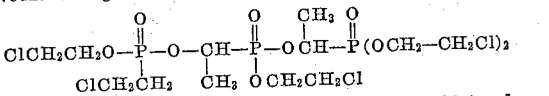

Phosgard C-22-R has an approximate molecular weight of 611 and a specific gravity at 25°/25° C. of 1.425-1.445.

Rockwell hardness, heat distortion temperature, elevated temperature flexural strength at 155° C., and flame-retardance.

Additional cured resins having varied formulations were prepared from this same epoxidized polybutadiene following the above procedure. In the following table, formulations *a–j* show the use of tris(β-chloroethyl) phosphate in amounts varying from 2.5–70 parts per 100. Formulations *k* and *l* illustrate different tris(haloalkyl) phosphates, while formulation *m* contains Phosgard C-22-R, a phosphorus ester sold by Monsanto Chemical Co. containing

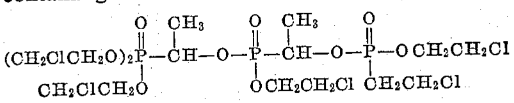

*Example 2*

Butadiene was polymerized as follows: Four parts of sodium as a 50% dispersion in kerosene and 200 parts of benzene were charged to an agitated reactor. The temperature was raised to 89° C. and 8 parts of butadiene was added. After an induction period of about five minutes, 92 parts of butadiene and 20 parts of dioxane were charged continuously to the reactor, at an average temperature of about 101° C. After 70 minutes the mixture was cooled to 50° C., and 29 parts of glacial acetic acid was added. The mixture was filtered through soda ash, and volatiles were removed at 50–65° C. and 0.5–2 mm. Hg. The residue was a liquid polybutadiene having an iodine number of 385 and a viscosity of 15 poises at 25° C. and zero shear.

The polybutadiene was epoxidized as follows: One hundred parts of polybutadiene was dissolved in 100 parts of benzene, and 10 parts of 90% formic acid was added. The mixture was maintained at 60° C. while 72 parts of 50% hydrogen peroxide was added over a period of three hours. The reaction continued for an additional four hours, and the product was recovered as described in Example 1. The resulting epoxidized polybutadiene had an epoxy content of 9.24% and a viscosity of 1,839 poises at 25° C. and zero shear.

The epoxy resin was cured as follows: A mixture containing 24 parts of m-phenylenediamine and 5 parts of resorcinol was heated at 100° C. until all solids were melted, and the resulting liquid mixture was blended with a mixture containing 100 parts of epoxidized polybutadiene and 10 parts of tris(β-chloroethyl) phosphate. The blend was cast as a sheet and cured by baking in an oven for 1 hour at 100° C. and postcured at 155° C. for 24 hours. Specimens of the cured resin were tested to determine room temperature flexural strength, Rockwell hardness, heat distortion temperature and flame-retardance.

Additional cured resins were prepared from this epoxidized polybutadiene using different phosphorus esters. Formulation *d* is a control containing no phosphorus ester.

TABLE 2

| | Formulation | Parts | Flexural Strength, p.s.i. | Rockwell Hardness, M scale | Heat Distortion Temp., °C. | Flame-Retardance |
|---|---|---|---|---|---|---|
| (a) | Epoxidized polybutadiene | 100 | 16,700 | 119 | 175 | Nonburning. |
| | m-Phenylenediamine | 24 | | | | |
| | Tris(β-chloroethyl) phosphate | 10 | | | | |
| | Resorcinol | 5 | | | | |
| (b) | Epoxidized polybutadiene | 100 | 17,300 | 120 | 181 | Do. |
| | m-Phenylenediamine | 24 | | | | |
| | Tris(bromochloropropyl) phosphate | 10 | | | | |
| | Resorcinol | 5 | | | | |
| (c) | Epoxidized polybutadiene | 100 | 16,400 | 119 | 187 | Do. |
| | m-Phenylenediamine | 24 | | | | |
| | Tris(dichloropropyl) phosphate | 10 | | | | |
| | Resorcinol | 5 | | | | |
| (d) | Epoxidized polybutadiene | 100 | 16,200 | 107 | 115 | Burning 0.41 in./min. |
| | m-Phenylenediamine | 24 | | | | |
| | Resorcinol | 5 | | | | |

*Example 3*

Butadiene was polymerized as follows: About 4.3 parts of sodium as a 46% dispersion in kerosene and 162 parts of benzene were charged to an agitated reactor, the temperature was raised to 90° C., and 4 parts of technical grade butadiene was added. The temperature was maintained at about 85° C., while 96 parts of butadiene and 20 parts of dioxane were added over a period of 3.5 hours. The reaction ingredients were cooled to 50° C., and 19 parts of glacial acetic acid was added. The mixture was then filtered and stripped as described in Example 1. The liquid polybutadiene product had an iodine number of 375 and a viscosity of 11 poises at 25° C. extrapolated to zero shear.

This polybutadiene was epoxidized as follows: About 100 parts of liquid polybutadiene, 100 parts of benzene, 32 parts of Dowex resin 50 X–12 (a sulfonated styrene-divinylbenzene polymer cross-linked with 12% divinylbenzene) and 16 parts of glacial acetic acid were heated with agitation to 60° C. About 70 parts of 50% hydrogen peroxide was then added over a period of 3 hours. The temperature was maintained at 60° C. for an additional 4 hours after which the mixture was cooled to 30° C., mixed with 125 parts of benzene and 26 parts of soda ash, and allowed to settle. The oily layer was separated and filtered. The filtrate was heated to 80° C. to remove the water azeotropically, and then stripped of benzene at 35° C. and 60 mm. Hg. The epoxidized polybutadiene obtained as residue had an epoxy oxygen content of 9.0% and a viscosity of 1,280 poises at 25° C. and zero shear.

The epoxy resin was cured as follows: A mixture containing 24 parts of m-phenylenediamine and 5 parts of resorcinol was heated at 100° C. until all solids were melted, and the resulting liquid mixture was blended with a mixture containing 100 parts of epoxidized polybutadiene and 10 parts of tris(β-chloroethyl) phosphate. The blend was cast as a sheet and cured for 1 hour in an oven at 100° C. and postcured at 155° C. for 24 hours. Specimens of the casting were tested to measure room temperature flexural strength, Rockwell hardness, heat distortion temperature and flame-retardance.

Additional cured resins were prepared from this epoxidized polybutadiene. Formulation *b* shows the effect of only 12 parts of m-phenylenediamine (0.4 amine equivalent per epoxy equivalent) while formulation *c* is a control containing no phosphorus ester.

TABLE 3

| | Formulation | Parts | Flexural Strength, p.s.i. | Heat Distortion Temp., ° C. | Rockwell Hardness, M scale | Flame-Retardance |
|---|---|---|---|---|---|---|
| (a) | Epoxidized polybutadiene | 100 | 19,400 | 161 | 119 | Nonburning. |
| | m-Phenylenediamine | 24 | | | | |
| | Tris(β-chloroethyl) phosphate | 10 | | | | |
| | Resorcinol | 5 | | | | |
| (b) | Epoxidized polybutadiene | 100 | 13,200 | 101 | 112 | Do. |
| | m-Phenylenediamine | 12 | | | | |
| | Tris(β-chloroethyl) phosphate | 20 | | | | |
| | Resorcinol | 5 | | | | |
| (c) | Epoxidized polybutadiene | 100 | 15,800 | 101 | 102 | Burning, 1.0 in./min. |
| | m-Phenylenediamine | 24 | | | | |
| | Resorcinol | 5 | | | | |

*Example 4*

A butadiene copolymer was prepared as follows: A mixture of 40 parts of m-xylene, 30 parts of benzene and 20 parts of sodium dispersion, prepared by dispersing about 30% by weight of sodium in benzene, was charged under nitrogen to an autoclave, sealed and heated to 90° C. The gases were vented, and to the autoclave was charged a total of 100 parts of butadiene under 15 p.s.i.g. pressure. The temperature was maintained at about 90° C., and the pressure at 10 to 15 p.s.i.g., during addition of the butadiene. After all the butadiene had been added the reaction was continued for 30 min., and the reaction mixture was cooled to room temperature and quenched into excess water. The aqueous phase was discarded, and the oil phase was neutralized, washed, and stripped of solvent. The residue was 140 parts of a fluid copolymer oil having a viscosity at 25° C. of about 70 centipoises, and an iodine number of 313.

The copolymer was epoxidized as follows: One hundred parts of the copolymer were dissolved in 200 parts of benzene and epoxidized by adding 135 parts of commercial 40% peracetic acid and 62 parts of 50% aqueous sodium hydroxide simultaneously at 50–55° C. over a period of 2 hrs. The reaction mixture was allowed to continue to react for an additional 2 hrs., cooled, washed repeatedly with water, and distilled free of solvent to yield an almost colorless oil analyzing 8.95% oxirane oxygen and having a viscosity of 75 poises at 25° C. extrapolated to zero shear.

The epoxidized butadiene-xylene copolymer was cured as follows: A mixture containing 24 parts of m-phenylenediamine and 5 parts of resorcinol was heated at 100° C. until all solids were melted, and the resulting liquid mixture was blended with a mixture containing 100 parts of epoxidized butadiene copolymer and 20 parts of tris(β-chloroethyl) phosphate. The blend was cast as a sheet and cured by baking in an oven for 1 hr. at 100° C. and 4 hrs. at 155° C. Specimens of the cured resin were tested to determine room temperature flexural strength. Additional specimens were postcured at 155° C. for an additional 20 hours, and tested for room temperature flexural strength, Rockwell hardness, heat distortion temperature, and flame-retardance.

For comparison, the above example was repeated except that the 20 parts of tris(β-chloroethyl) phosphate was omitted. The data obtained for this example are given in Table 4.

*Example 5*

A commercially available copolymer containing 70% butadiene and 30% styrene having a molecular weight of 9,000, an iodine number of 300, and a viscosity of 3,500 poises was epoxidized as follows: One hundred parts of the copolymer were dissolved in 200 parts of benzene and epoxidized by adding 50 parts of commercial 40% peracetic acid and 2 parts of 50% aqueous sodium hydroxide simultaneously at 50–55° C. over a period of 2 hrs. The reaction mixture was allowed to continue to react for an additional 0.5 hours, cooled, washed repeatedly with water, and distilled free of solvent to yield a resin containing 4% oxirane oxygen and having a viscosity of 40,000 poises at 25° C. extrapolated to zero shear.

The epoxidized butadiene-styrene copolymer was cured as follows: A mixture containing 10.7 parts of m-phenylenediamine and 5 parts of resorcinol was heated at 100° C. until all solids were melted, and the resulting liquid mixture was blended with a mixture containing 100 parts of the epoxidized copolymer and 20 parts of tris(β-chloroethyl) phosphate. The blend was cast as a sheet and cured by baking in an oven for 1 hr. at 100° C. and postcured at 155° C. for 24 hrs. Speimens of the cured resin were tested to determine room temperature flexural strength, Rockwell hardness, heat distortion temperature, and flame-retardance.

For comparison, the example was repeated omitting the 20 parts of tris(β-chloroethyl) phosphate from the formulation. The data obtained for this example are presented in Table 5.

*Example 6*

Butadiene was polymerized as follows: About 4.3 parts of sodium as a 46% dispersion in kerosene and 162 parts of benzene were charged to an agitated reactor, the temperature was raised to 90° C., and 10 parts of technical grade butadiene was added. The temperature was maintained at about 85° C., while 90 parts of butadiene and 20 parts of dioxane were added over a period of 3.5 hours. The reaction ingredients were cooled to 50° C. and the catalyst was destroyed by the addition of 19 parts of glacial acetic acid. The mixture was then filtered and stripped as described in Example 1. The liquid polybutadiene product had an iodine number of 390 and a viscosity of 17 poises at 25° C. extrapolated to zero shear.

The polybutadiene was epoxidized as follows: One

TABLE 4

| | Formulation | Parts | Room Temperature Flexural Strength, p.s.i. | Rockwell Hardness, M scale | Heat Distortion Temp., ° C. | Elevated Temperature Flexural Strength | Flame-Retardance |
|---|---|---|---|---|---|---|---|
| (a) | Epoxidized butadiene-xylene copolymer. | 100 | 17,300 | 117 | 128 | 2,400 | Non-burning. |
| | m-Phenylenediamine | 24 | | | | | |
| | Tris (β-chloroethyl) phosphate | 20 | | | | | |
| | Resorcinol | 5 | | | | | |
| (b) | Epoxidized butadiene-xylene copolymer. | 100 | 18,300 | 105 | 79 | Soft | Burns, 0.6 in./min. |
| | m-Phenylenediamine | 24 | | | | | |
| | Resorcinol | 5 | | | | | |

TABLE 5

| | Formulation | Parts | Flexural Strength, p.s.i. | Rockwell Hardness, M scale | Heat Distortion Temperature, ° C. | Flame-Retardance |
|---|---|---|---|---|---|---|
| (a) | Epoxidized butadiene-styrene copolymer | 100 | 3,750 | 35 | 33 | Self-ext., 1.5 in. |
| | m-Phenylenediamine | 10.7 | | | | |
| | Tris(β-chloroethyl) phosphate | 20 | | | | |
| | Resorcinol | 5 | | | | |
| (b) | Epoxidized butadiene-styrene copolymer | 100 | 1,400 | Soft | 26 | Burning, 1.2 in./min. |
| | m-Phenylenediamine | 10.7 | | | | |
| | Resorcinol | 5 | | | | |

hundred parts of polybutadiene was dissolved in 100 parts of benzene, and 10 parts of 90% formic acid was added. The mixture was maintained at 60° C. while 70 parts of 50% hydrogen peroxide was added over a period of three hours. The reaction continued for an additional four hours, and the product was recovered as described in Example 1. The resulting epoxidized polybutadiene had an epoxy content of 9.0% and a viscosity of 2,068 poises at 25° C. and zero shear.

Laminates were prepared from this epoxidized polybutadiene as follows: A mixture containing 24 parts of m-phenylenediamine and 5 parts of resorcinol was heated at 100° C. until all solids were melted, and the resulting liquid mixture was blended with a mixture containing 100 parts of epoxidized polybutadiene and 10 parts of tris(β-chloroethyl) phosphate. Using standard wet lay-up techniques, a 13-ply laminate was prepared by working the resin composition into successive layers of No. 181-136 fiber glass cloth having a vinyl trichlorosilane finish. The lay-up was molded using a ⅛ inch shim in a hydraulic press at 155° C. for 30 minutes. The laminate was post-cured for 24 hours in an oven at 155° C. Specimens were cut from the laminate and tested to determine flexural strength and compressive strength.

For the purpose of comparison, another laminate was prepared as before except that the tris(β-chloroethyl) phosphate was omitted. The following data were obtained for these laminates.

TABLE 6

| | Formulation | Parts | Flexural Strength, p.s.i. | Compressive Strength, p.s.i. |
|---|---|---|---|---|
| (a) | Epoxidized polybutadiene | 100 | 65,900 | 39,800 |
| | m-Phenylenediamine | 24 | | |
| | Tris(β-chloroethyl) phosphate | 10 | | |
| | Resorcinol | 5 | | |
| (b) | Epoxidized polybutadiene | 100 | 61,800 | 29,700 |
| | m-Phenylenediamine | 24 | | |
| | Resorcinol | 5 | | |

As will be apparent to those skilled in the art, numerous modifications and variations of the formulations illustrated above may be made without departing from the spirit of the invention or the scope of the following claims.

I claim:

1. A flame-retardant epoxy resin composition comprising the reaction product of 100 parts by weight of an epoxidized butadiene polymer of a liquid butadiene polymer having a number average molecular weight of at least 100, said epoxidized butadiene polymer containing 4–10% by weight of epoxy oxygen, 0.4–1.0 equivalent per epoxide equivalent of an aromatic diamine and 1–75 parts by weight of a phosphorus ester having the formula:

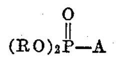

wherein A is a radical selected from the group consisting of —OR and

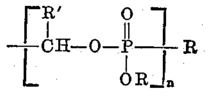

in which R is a haloalkyl radical containing 2–3 carbon atoms and 1–2 halogen atoms of the group consisting of chlorine and bromine, R′ is a member of the group consisting of hydrogen and alkyl radicals containing 1–3 carbon atoms, and $n$ is an integer from 1–3.

2. A flame-retardant epoxy resin composition comprising the reaction product of 100 parts by weight of an epoxidized butadiene polymer of a liquid butadiene polymer having a number average molecular weight of 250–10,000, said epoxidized butadiene polymer containing 8–10% by weight of epoxy oyxgen, 0.6–1.0 equivalent per epoxide equivalent of an aromatic diamine and 5–40 parts by weight of a phosphorus ester having the formula:

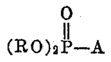

wherein A is a radical selected from the group consisting of —OR and

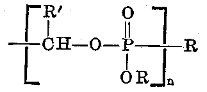

in which R is a haloalkyl radical containing 2–3 carbon atoms and 1–2 halogen atoms of the group consisting of chlorine and bromine, R′ is a member of the group consisting of hydrogen and alkyl radicals containing 1–3 carbon atoms, and $n$ is an integer from 1–3.

3. A flame-retardant epoxy resin composition in accordance with claim 2 in which the phosphorus ester is a tris(haloalkyl) phosphate.

4. A flame-retardant epoxy resin composition in accordance with claim 2 in which the phosphorus ester has the formula:

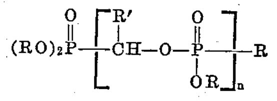

5. A flame-retardant epoxy resin composition comprising the reaction product of 100 parts by weight of an epoxidized polybutadiene of a liquid polybutadiene having a number average molecular weight of 250–2,500, said epoxidized polybutadiene having an epoxy oxygen content of 8–10% and a viscosity of 1,000–3000 poises, 20–29 parts by weight of m-phenylenediamine, 10–30 parts by weight of a tris(β-chloroethyl) phosphate and 2–8 parts by weight of resorcinol.

6. A curable resin composition which comprises a stable mixture containing 100 parts by weight of an epoxidized butadiene polymer of a liquid butadiene polymer having a number average molecular weight of at least 100, said epoxidized butadiene polymer having an epoxy oxygen content of 4–10%, and 1–75 parts by weight of a phosphorus ester having the formula:

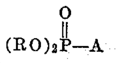

wherein A is a radical selected from the group consisting of —OR and

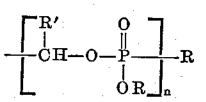

in which R is a haloalkyl radical containing 2–3 carbon atoms and 1–2 halogen atoms of the group consisting of chlorine and bromine, R′ is a member of the group consisting of hydrogen and alkyl radicals containing 1–3 carbon atoms, and $n$ is an integer from 1–3.

7. A curable resin composition which comprises a stable mixture containing 100 parts by weight of an epoxidized polybutadiene of a liquid polybutadiene having a number average molecular weight of 250–2,500, said epoxidized polybutadiene having an epoxy oxygen content of 8–10% and a viscosity of 1,000–3,000 poises and 10–30 parts by weight of tris($\beta$-chloroethyl) phosphate.

References Cited by the Examiner

UNITED STATES PATENTS

| | | | |
|---|---|---|---|
| 2,710,844 | 6/1955 | Thompson | 260—30.6 |
| 2,829,130 | 4/1958 | Greenspan et al. | 260—94.7 |
| 3,022,322 | 2/1962 | Wheelock | 260—2 |

FOREIGN PATENTS

| | | |
|---|---|---|
| 1,113,826 | 9/1961 | Germany. |

OTHER REFERENCES

Celanese Product Bulletin No. CEF–7 OB8–1, Dec., 1957, 260–2.

Celanese New Product Bulletin, No. N–78 OBO–39, Nov., 1960, 260–2.

Lee et al.: Epoxy Resins, McGraw-Hill, New York, 1957, pp. 90–110.

WILLIAM H. SHORT, *Primary Examiner.*

JOSEPH R. LIBERMAN, *Examiner.*

H. D. ANDERSON, *Assistant Examiner.*

UNITED STATES PATENT OFFICE
CERTIFICATE OF CORRECTION

Patent No. 3,312,636 April 4, 1967

John J. Rizzo

It is hereby certified that error appears in the above numbered patent requiring correction and that the said Letters Patent should read as corrected below.

Column 1, line 15, for "polyfuctional" read -- polyfunctional --; line 46, for "polymere" read -- polymer --; line 69, for "quire" read -- quite --; column 2, line 54, for "member" read -- number --; column 3, line 22, for "caried" read -- carried -- line 75, for "part" read -- parts --; column 4, line 47, the formula should appear as shown below instead of as in the patent column 6, line 72, for "10" read -- 100 --; column 12, line 23, for "Speimens" read -- Specimens --.

Signed and sealed this 21st day of November 1967.

(SEAL)
Attest:

EDWARD M.FLETCHER,JR.
Attesting Officer

EDWARD J. BRENNER
Commissioner of Patents